(12) United States Patent
Ikeda

(10) Patent No.: US 11,714,770 B2
(45) Date of Patent: Aug. 1, 2023

(54) RELAY DEVICE AND METHOD OF CONTROLLING RELAY DEVICE

(71) Applicant: CANON KABUSHIKI KAISHA, Tokyo (JP)

(72) Inventor: Makoto Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/539,293

(22) Filed: Dec. 1, 2021

(65) Prior Publication Data
US 2022/0179816 A1    Jun. 9, 2022

(30) Foreign Application Priority Data

Dec. 4, 2020 (JP) .................. 2020-202273

(51) Int. Cl.
*G06F 13/38* (2006.01)
(52) U.S. Cl.
CPC .......... *G06F 13/387* (2013.01); *G06F 13/385* (2013.01); *G06F 2213/0042* (2013.01)
(58) Field of Classification Search
CPC ........... G06F 2213/0042; G06F 13/387; G06F 13/385
See application file for complete search history.

(56) References Cited

U.S. PATENT DOCUMENTS

| | | | | |
|---|---|---|---|---|
| 2004/0218045 A1* | 11/2004 | Bodnar | .................. | G06Q 30/02 348/E5.042 |
| 2005/0237426 A1* | 10/2005 | Takashima | ............. | G03B 15/05 348/E5.025 |
| 2011/0221910 A1* | 9/2011 | Nonaka | .................... | H04N 5/77 348/207.1 |
| 2014/0063291 A1* | 3/2014 | Ohshima | .................. | H04N 5/77 348/231.99 |
| 2015/0227489 A1* | 8/2015 | Chen | ..................... | G06F 13/385 710/313 |
| 2015/0293514 A1* | 10/2015 | Tupala | ............. | G01R 19/16595 307/130 |
| 2017/0302856 A1* | 10/2017 | Noguchi | ................ | H04N 5/265 |
| 2018/0184001 A1* | 6/2018 | Yoshida | ................. | H04N 9/045 |
| 2018/0205836 A1* | 7/2018 | Odagaki | ............ | H04N 1/00127 |

FOREIGN PATENT DOCUMENTS

JP      2011-097169 A     5/2011

* cited by examiner

*Primary Examiner* — Henry Tsai
*Assistant Examiner* — Aurangzeb Hassan
(74) *Attorney, Agent, or Firm* — Cowan, Liebowitz & Latman, P.C.

(57) ABSTRACT

A relay device includes a first connecting unit, a second connecting unit, a first notifying unit, a second notifying unit, and a communicating unit. The first connecting unit is connected with a first interface of a first device, the first interface being not compliant with USB (Universal Serial Bus) standard. The second connecting unit is connected with a second interface of a second device, the second interface being compliant with the USB standard. The first notifying unit notifies the second device that the relay device is a USB device. The second notifying unit notifies the first device that the second device has been connected to the second connecting unit. The communicating unit relays communication carried out between the second device and the first device.

15 Claims, 6 Drawing Sheets

RELAY DEVICE AND METHOD OF CONTROLLING RELAY DEVICE

BACKGROUND

Field of the Disclosure

Aspects of the disclosure generally relate to a relay device which relays USB communication, and a method of controlling the relay device.

Description of the Related Art

Japanese Patent Laid-Open No. 2011-97169 indicates that upon detecting an impact on a vehicle, a charger of the vehicle notifies a mobile phone connected to the charger of the impact given on the vehicle.

Japanese Patent Laid-Open No. 2011-97169 does not include any description about USB (Universal Serial Bus) standard. Therefore, Japanese Patent Laid-Open No. 2011-97169 does not describe a configuration and method for carrying out USB communication between a device having an interface (or a connection part) which is compliant with the USB standard and a device having an interface (or a connection part) which is not compliant with the USB standard.

SUMMARY

According to various embodiments, USB communication is enabled between a device having an interface (or a connection part) which is compliant with the USB standard and a device having an interface (or a connection part) which is not compliant with the USB standard.

According to various embodiments, there is provided a relay device that includes a first connecting unit to be connected with a first interface of a first device, the first interface being not compliant with USB (Universal Serial Bus) standard; a second connecting unit to be connected with a second interface of a second device, the second interface being compliant with the USB standard; a first notifying unit that notifies the second device that the relay device is a USB device; a second notifying unit that notifies the first device that the second device has been connected to the second connecting unit; and a communicating unit that relays communication carried out between the second device and the first device.

According to various embodiments, there is provided a method of controlling a relay device comprising a first connecting unit to be connected with a first interface of a first device and a second connecting unit to be connected with a second interface of a second device, the first interface being not compliant with USB (Universal Serial Bus) standard and the second interface being compliant with the USB standard. The method includes notifying the second device that the relay device is a USB device; notifying the first device that the second device has been connected to the second connecting unit; and relaying communication carried out between the second device and the first device.

Further aspects of the disclosure will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
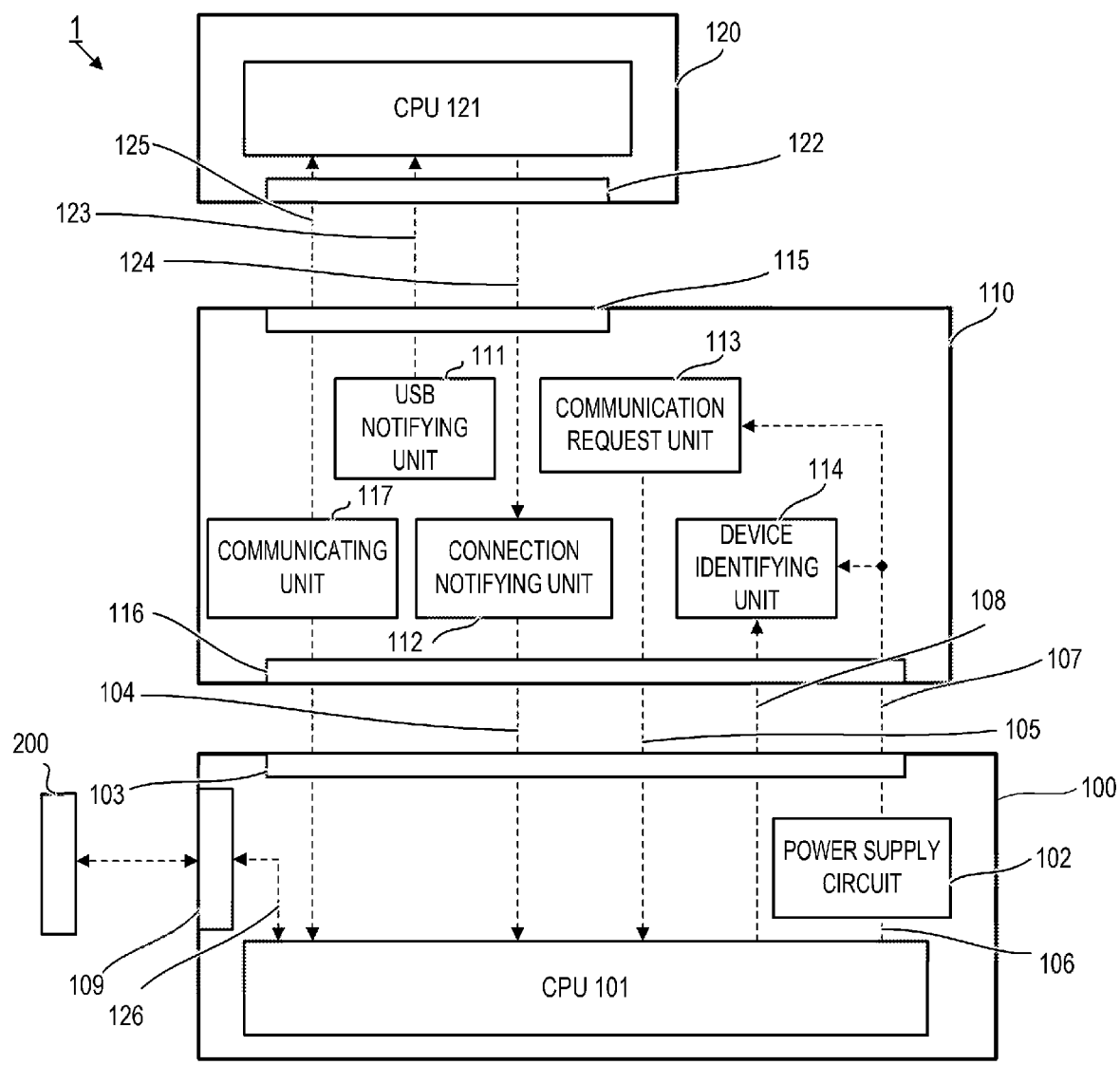
FIG. 1 is a diagram for illustrating components of a communication system 1 according to a first embodiment.

FIG. 1 is a diagram for illustrating components of a communication system 1 according to a first embodiment. The communication system 1 has a first device 100, a relay device 110, and a second device 120. According to the first embodiment, the first device 100 is configured to operate as a USB (Universal Serial Bus) device, and the second device 120 is configured to operate as a USB host. The relay device 110 has a function to notify the second device 120 that the relay device 110 is a USB device but does not operate as a USB device.

According to the first embodiment, the relay device 110 is connected to the ACC connector 103 of the first device 100 which operates as a USB device, and to the USB connector 122 of the second device 120 which operates as a USB host. When the relay device 110 is connected to the USB connector 122 of the second device 120, the relay device 110 notifies the second device 120 that the relay device 110 is a USB device. After the relay device 110 notifies the second device 120 that the relay device 110 is a USB device, the relay device 110 notifies the first device 100 that the second device 120 has been connected to the relay device 110. When the relay device 110 notifies the first device 100 that the second device 120 has been connected to the relay device 110, the first device 100 operates as a USB device. In this way, the connection relation between a USB host and a USB device is indirectly established between the second device 120 and the first device 100. Then, the relay device 110 relays communication compliant with the USB standard (USB communication) between the first device 100 and the second device 120. This allows the first device 100 and the second device 120 to perform USB communication through the relay device 110.

The first device 100 has a CPU 101, a power supply circuit 102, an ACC connector 103, and a USB connector 109. The first device 100 has an image capture unit including a CMOS sensor or a CCD sensor, a lens unit, and other elements. The first device 100 is an electronic device capable of acting as an image capture device, such as a digital camera.

The CPU 101 is a control unit including a microcomputer. The CPU 101 can control all the components of the first device 100 by executing a program stored in the memory.

The CPU 101 controls input and output of a connection detection signal 104, a communication request signal 105, a control signal 108, and a power supply control signal 106. The connection detection signal 104 is a signal for the first device 100 to detect the connection of the second device 120 to the relay device 110. The communication request signal 105 is an interrupt signal from the relay device 110. The power supply control signal 106 is a signal for the CPU 101 to control the power supply circuit 102. The control signal 108 is a signal for the CPU 101 to control the relay device 110.

The CPU 101 has a USB port A and a USB port B for USB communication. The USB port A is connected to the second device 120 (CPU 121) through the relay device 110 by communication with a USB data signal 125. The USB port B is connected to the USB connector 109 by communication with an external USB data signal 126.

The power supply circuit 102 generates power 107 and supplies the generated power 107 to a communication request unit 113 and a device identifying unit 114. The power supply circuit 102 includes a DC/DC converter or/and an LDO (Low Dropout) regulator.

The ACC connector (an accessory connector) 103 is a dedicated connector for connecting to the relay device 110 (an ACC connector 116). The ACC connector 103 is an interface (or a connection part) which is not compliant with the USB standard or USB Type-C standard. The ACC connector 103 functions as an accessory shoe for connecting a device such as a flash device and a viewfinder device to the first device 100.

The USB connector 109 is used to connect with the external device 200. The USB connector 109 is an interface (or a connection part) which is compliant with the USB standard.

Note that according to the first embodiment, the first device 100 includes the USB connector 109 by way of illustration, but the first device 100 does not need to include the USB connector 109. In this case, the CPU 101 does not need to have a USB port B.

The relay device 110 has a USB notifying unit 111, a connection notifying unit 112, the communication request unit 113, the device identifying unit 114, a USB connector 115, the ACC connector 116, and a communicating unit 117. The relay device 110 may operate as one of accessory devices that can be connected to the first device 100.

The USB notifying unit 111 notifies the second device 120 by a CC signal 123 that the relay device 110 is a USB device.

The connection notifying unit 112 switches the voltage level (potential) of the connection detection signal 104 by applying a VBUS signal 124. The connection notifying unit 112 has for example a transistor.

The communication request unit 113 changes the voltage level (potential) of the communication request signal 105 after a certain period of time after the power 107 is supplied from the first device 100 (the power supply circuit 102). The communication request unit 113 has for example a reset IC.

The device identifying unit 114 is a storage unit having an EEPROM (electrically erasable and writable memory) for storing various parameters and unique numbers.

The USB connector 115 is an interface (or a connection part) which is compliant with the USB standard and the USB Type-C standard. The ACC connector 116 is a dedicated connector to connect with the first device 100 (the ACC connector 103). The ACC connector 116 is an interface (or a connection part) which is not compliant with the USB or USB Type-C standards.

The communicating unit 117 relays USB communication which is communication compliant with the USB standard between the first device 100 and the second device 120. The communicating unit 117 further relays and transmits the USB data signal 125 from the first device 100 to the second device 120 to negotiate the USB communication between the first device 100 and the second device 120.

The second device 120 has a USB connector 122 and the CPU 121 including a microcomputer. The second device 120 is, for example, an electronic device capable of acting as an information processing device such as a smartphone or a PC (personal computer).

After the connection relation is established between the USB host and the USB device by the CC signal 123 and the VBUS signal 124, the CPU 121 performs a preparation process for negotiating the USB communication. Upon completing the negotiation of the USB communication, the CPU 121 can carry out USB communication with the CPU 101 through the relay device 110. In this way, various kinds of data (the USB data signal 125) is transmitted or received between the CPU 121 and the CPU 101.

The USB connector 122 is an interface (or a connection part) which is compliant with the USB standard and the USB Type-C standard. The USB connector 122 and the USB connector 115 can be physically and electrically connected by a USB cable.

Figure 2:
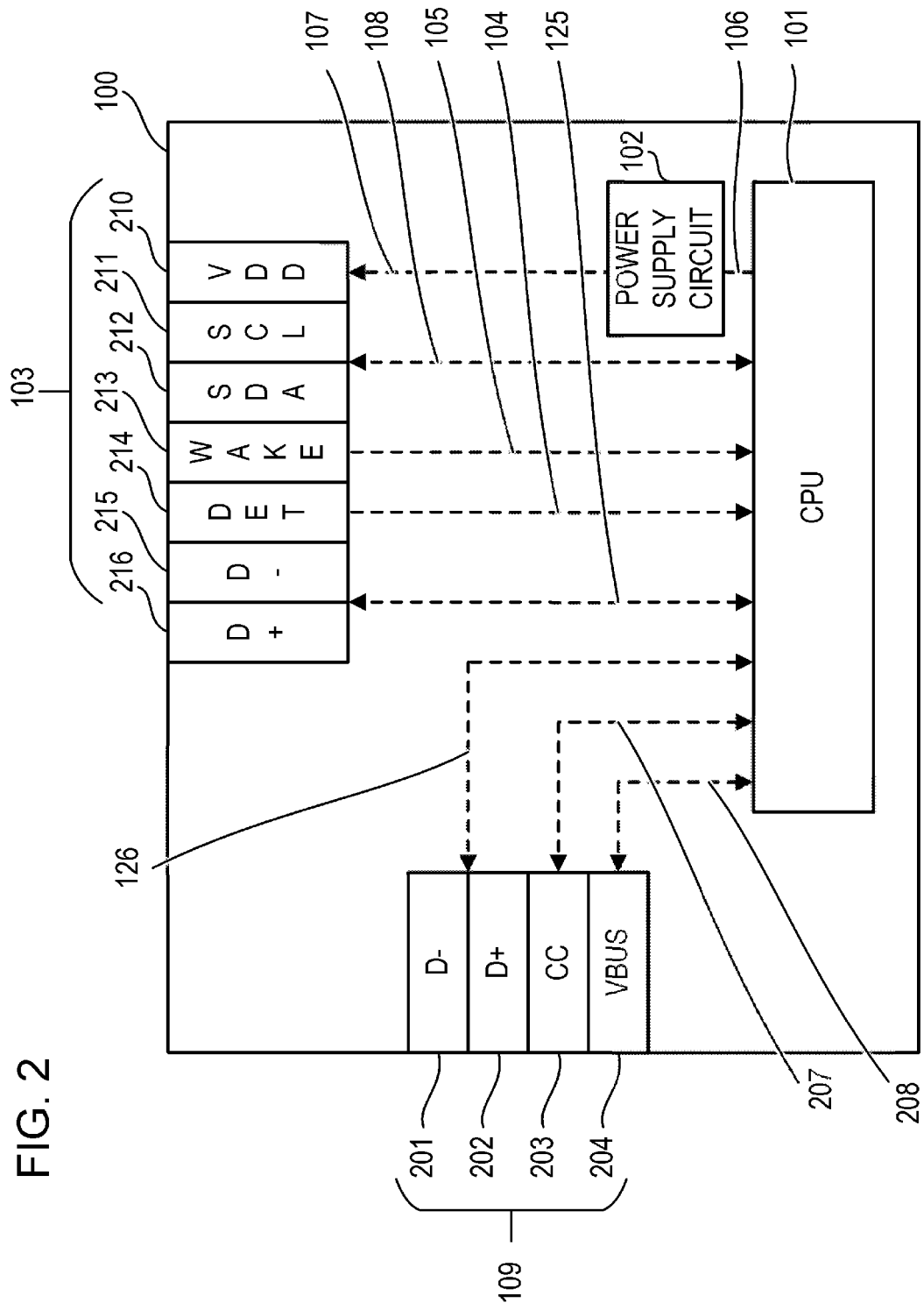
FIG. 2 is a diagram for illustrating components of a first device 100 according to the first embodiment.

Now, with reference to FIG. 2, the configuration of the first device 100 will be described in detail. FIG. 2 illustrates components of the first device 100 more in detail. The ACC connector 103 has a VDD (Voltage Drain) pin 210, an SCL (Serial Clock Line) pin 211, an SDA (Serial Data Line) pin 212, a WAKE pin 213, a DET pin 214, a D− pin 215, and a D+ pin 216.

The VDD pin 210 is used to obtain the power 107 from the power supply circuit 102 and output the power 107 to the relay device 110. The SCL pin 211 and the SDA pin 212 are used to input or output a control signal 108. The WAKE pin 213 is used to input or output the communication request signal 105. The D− pin 215 and D+ pin 216 are used to input or output the USB data signal 125. The DET pin 214 is used to input or output the connection detection signal 104.

The USB connector 109 has a D− pin 201, a D+ pin 202, a CC pin 203, and a VBUS pin 204.

The D− pin 201 and D+ pin 202 are used to input or output an external USB data signal 126. The CC pin 203 is used to input or output an external CC signal 207 for negotiating USB communication with an external device 200. The VBUS pin 204 is used to input or output an external VBUS signal 208.

The configuration of each connector shown in FIG. 2 is the minimum necessary configuration for the operation of the connector. Therefore, the connectors may be configured to input or output various other signals.

Next, with reference to the flowchart in FIG. 3, the operation of the relay device 110 and the first device 100 according to the first embodiment will be described. When the first device 100 is turned on as the user operates a group of switches of the first device 100, the CPU 101 is started up. The user then connects the ACC connector 116 of the relay device 110 to the ACC connector 103 of the first device 100. The user also connects the USB connector 122 of the second device 120 and the USB connector 115 of the relay device 110. As a result, the second device 120 and the first device 100 are electrically connected. When the user makes these connections, the process as shown in the flowchart in FIG. 3 starts.

Figure 3:
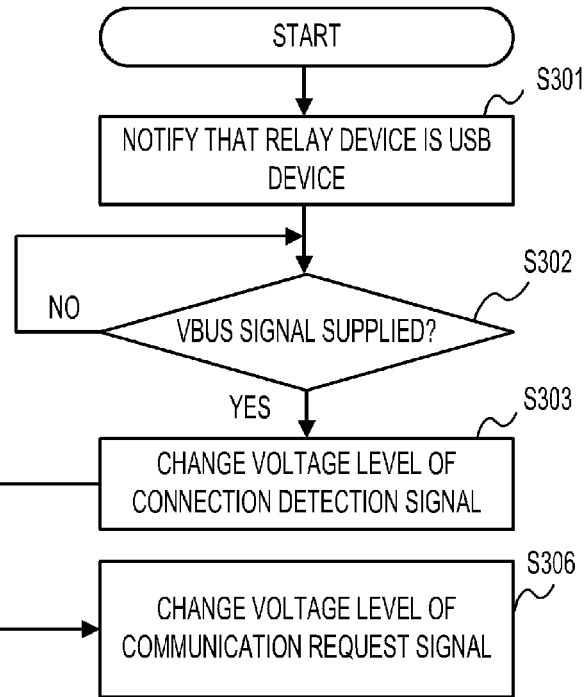
FIG. 3 is a flowchart for illustrating a USB communication process according to the first embodiment.
Figure 3:
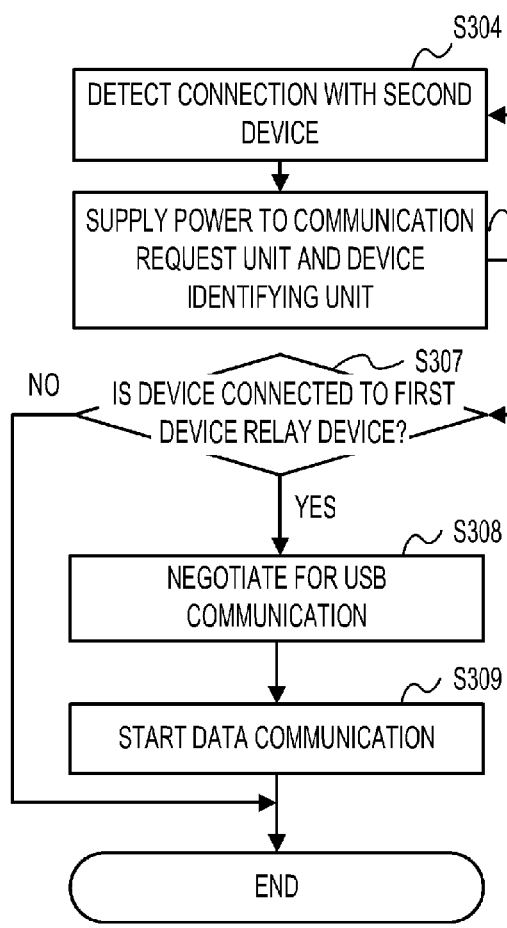

In the flowchart shown in FIG. 3, it is assumed that the first device 100 is connected with the relay device 110 as a relay device which relays USB communication between the first device 100 and the second device 120. Meanwhile, a relay device (such as an externally mounted flash or finder) which does not relay USB communication between the first device 100 and the second device 120 can also be connected to the first device 100. The relay device which does not relay the USB communication between the first device 100 and the second device 120 may also be capable of performing the process including steps S301 to S303 and S306 which will be described.

In step S301, the USB notifying unit 111 detects the connection of the second device 120 to the USB connector 115. Then, the USB notifying unit 111 notifies the CPU 121 of the second device 120 by the CC signal 123 that the relay device 110 is a USB device. For example, the USB notifying unit 111 pulls down the CC signal 123 (fixes the signal at the L level) because the USB connector 115 is an interface (or a connection part) which is compliant with the USB Type-C standard.

In step S302, the connection notifying unit 112 determines whether the VBUS signal 124 has been supplied from the second device 120. When the VBUS signal 124 has been supplied from the second device 120, the process proceeds to step S303, and when the VBUS signal 124 has not been supplied from the second device 120, the process in step S302 will be repeated.

In step S303, the connection notifying unit 112 changes (varies) the voltage level (potential) of the connection detection signal 104 based on the VBUS signal 124. By changing the voltage level of the connection detection signal 104, the connection notifying unit 112 notifies the first device 100 that the second device 120 has been connected to the relay device 110.

In step S304, the CPU 101 detects that the potential of the DET pin 214 (connection detection signal 104) of the ACC connector 103 has changed to a predetermined potential and detects (recognizes) the connection of the second device 120 (and the relay device 110).

In step S305, the CPU 101 controls the power supply circuit 102 by a power supply control signal 106 to supply power 107 to the communication request unit 113 and the device identifying unit 114. The communication request unit 113 and the device identifying unit 114 become operable by the power 107.

In step S306, the communication request unit 113 changes (varies) the voltage level (potential) of the communication request signal 105 after a pre-specified stand-by period has elapsed after the supply of the power 107. By changing the voltage level (potential) of the communication request signal 105, the communication request unit 113 requests the first device 100 to determine (identify) whether the device connected to the first device 100 is the relay device 110. The standby period is, for example, the period from when the power 107 is supplied to the device identifying unit 114 until communication by the control signal 108 is enabled.

In step S307, upon detecting change in the potential level of the communication request signal 105 to a predetermined potential, the CPU 101 reads the unique number (identification information) of the relay device 110 stored in the device identifying unit 114 using the control signal 108. The CPU 101 determines (recognizes) whether the device connected to the ACC connector 103 is the relay device 110 according to the unique number of the relay device 110.

According to the first embodiment, the relay device 110 as a relay device which relays USB communication is connected to the first device 100. Therefore, the unique number of the relay device 110 indicates that the device is a relay device which relays USB communication, and in step S307, the CPU 101 determines that the relay device 110 is a relay device which relays USB communication. In this case, the process proceeds to S308.

Here, when a device which is not the relay device 110 is connected to the first device 100, the CPU 101 determines that the device connected to the first device 100 is not the relay device 110 which performs USB communication. In this case, the CPU 101 ends the process as shown in the flowchart. Then, the CPU 101 does not perform negotiation using the USB data signal 125 but performs necessary control for each connected relay device using, for example, a control method such as I2C (Inter-Integrated Circuit).

In step S308, the CPU 101 notifies the CPU 121 through the communicating unit 117 that USB communication has been enabled. According to the first embodiment, the CPU 101 controls the USB data signal 125 to negotiate with the CPU 121 in order to execute USB communication. As a result, the USB communication between the second device 120 and the first device 100 is started.

In step S309, the CPU 101 starts the USB communication. For example, the CPU 101 transmits data (the USB data signal 125) such as image data captured by the image capture unit to the second device 120 by the USB communication through the communicating unit 117 of the relay device 110.

According to the first embodiment, the relay device 110 transmits, to the first device 100, the connection detection signal 104 based on the potential of the VBUS signal (the VBUS potential) supplied by the second device 120. In this way, the first device 100 can recognize the connection established between the relay device 110 and the second device 120. Then, the first device 100 can perform USB communication with the second device 120 through the relay device 110. According to the first embodiment, USB communication is enabled between the first device 100 and the second device 120 even when the second device 120 does not have a microcontroller for establishing a connection relation between the USB host and the USB device, so that the communication system 1 can have a simplified configuration.

Second Embodiment

According to the first embodiment, since the CPU 101 has the USB port A and the USB port B, the first device 100 can perform USB communication with both the second device 120 and the external device 200. Meanwhile, the CPU 101 may have only one USB port in some cases, and is capable of USB communication with either the second device 120 or the external device 200. Therefore, control of USB communication in such a case in a communication system 4 according to a second embodiment will be described.

Figure 4:
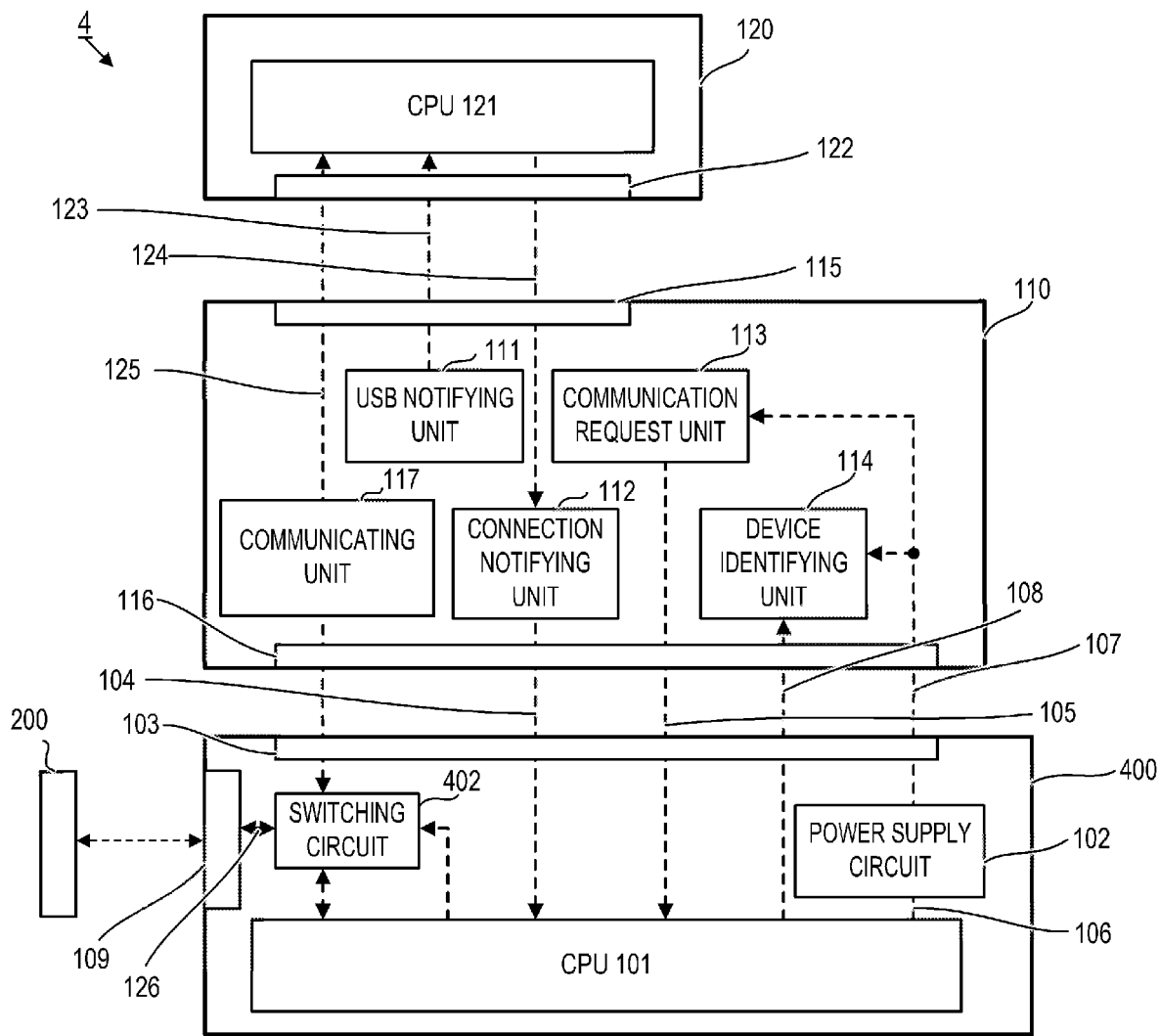
FIG. 4 is a diagram for illustrating components of a communication system 4 according to a second embodiment.

FIG. 4 is a diagram for illustrating components of the communication system 4 according to the second embodiment. The communication system 4 has a first device 400, a relay device 110, and a second device 120. Here, since the second device 120 and the relay device 110 have the same configurations as those according to the first embodiment, their configurations will not be described. The first device 400 further has a switching circuit 402 in addition to the components of the first device 100 according to the first embodiment.

Figure 5:
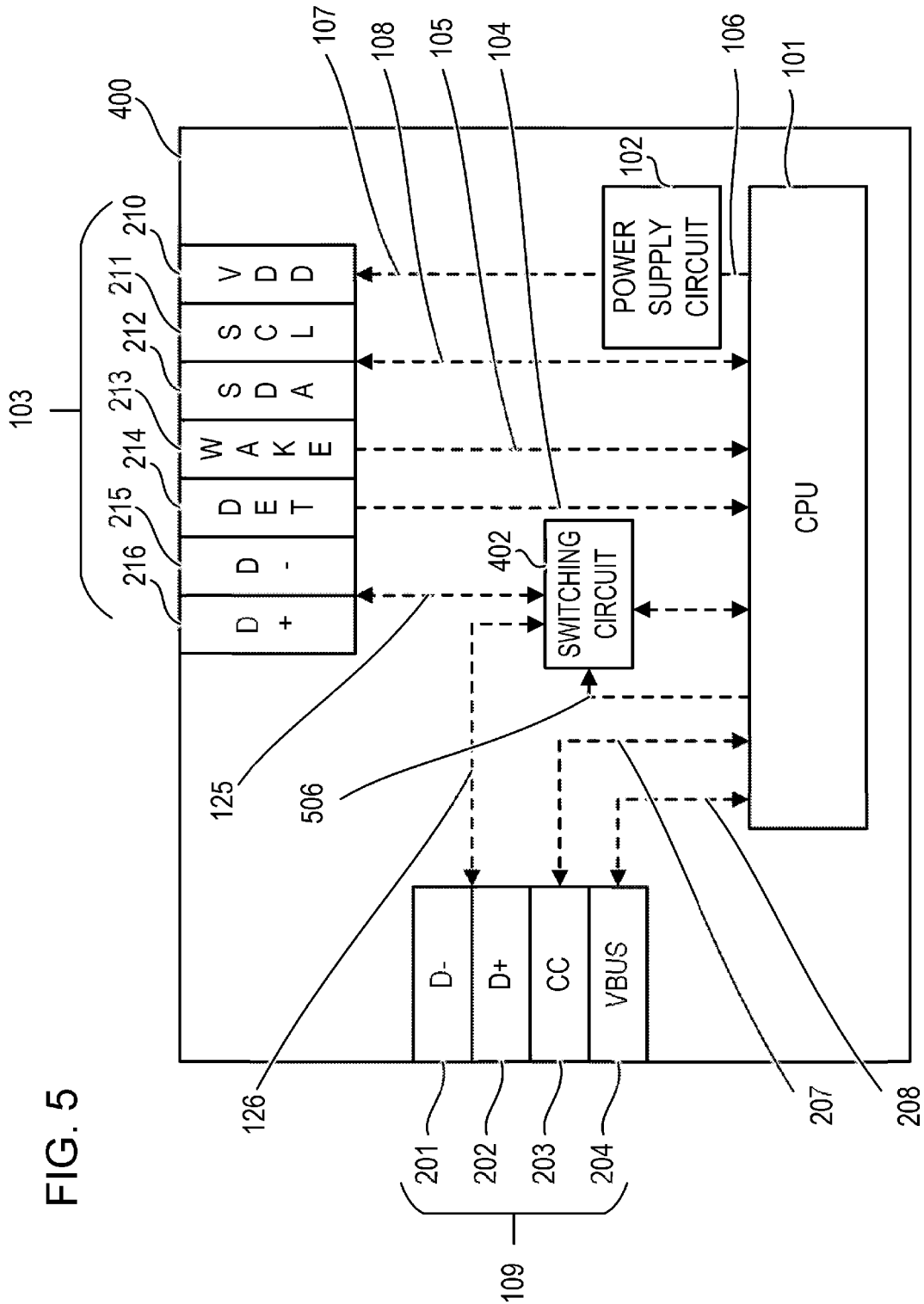
FIG. 5 is a diagram for illustrating components of a first device 400 according to the second embodiment.

The switching circuit 402 switches the signal to be input to or output from the USB port of the CPU 101 between the external USB data signal 126 and the USB data signal 125. As shown in FIG. 5, according to the second embodiment, the switching circuit 402 switches the signal to be input to or output from the USB port of the CPU 101 in response to a USB switching signal 506 input from the CPU 101. In this case, when the external USB data signal 126 is input to or output from the USB port, USB communication is enabled between the first device 100 and the external device 200. When the USB data signal 125 is input to or output from the USB port, USB communication is enabled between the first device 100 and the second device 120.

Here, the CPU 101 determines whether to perform USB communication with the second device 120 or the external device 200 in order to generate the USB switching signal 506. Then, the CPU 101 outputs the USB switching signal 506 indicating the device with which the USB communication is determined to be performed. Then, the switching circuit 402 switches the signal to be input to or output from the USB port of the CPU 101 so that USB communication can be performed with the device indicated by the USB switching signal 506.

The following description is about four exemplary methods (determining methods) which allow the CPU 101 to determine whether to perform USB communication with the second device 120 or the external device 200.

According to the first determination method (first insertion priority method), the CPU 101 determines the device which is connected (electrically connected) to the first device 100 first (the device with which USB communication is enabled) between the second device 120 and the external device 200 as the device with which USB communication is to be performed. According to the determination method, the CPU 101 carries out USB communication with the device which is connected to the first device 100 first between the second device 120 and the external device 200, and then does not switch the device for USB communication even when the other device is later connected to the first device 100.

According to the second determination method (later insertion priority method), the CPU 101 determines the device which is connected to the first device 100 later between the second device 120 and the external device 200 as the device with which USB communication is performed. According to the determination method, the CPU 101 performs USB communication with the device that is connected to the first device 100 first between the second device 120 and the external device 200, and then switches to perform USB communication with the other device when the device is connected to the first device 100.

According to the third determination method (main body priority method), the CPU 101 always determines to perform USB communication with the external device 200 when the second device 120 and the external device 200 are both connected to the first device 100. Note that the CPU 101 determines to perform USB communication with the second device 120 when not connected with the external device 200.

According to the fourth determination method (accessory priority method), the CPU 101 always determines to perform USB communication with the second device 120 when the second device 120 and the external device 200 are both connected to the first device 100. Note that the CPU 101 determines to perform USB communication with the external device 200 when not connected with the second device 120.

Note that according to any of the determination methods, when one of the devices is disconnected from the state where the second device 120 and the external device 200 are both connected to the first device 100, the CPU 101 may determine to perform USB communication with the other device. This can eliminate blank time in USB communication which may be created because of the disconnection of one of the devices.

Figure 6:
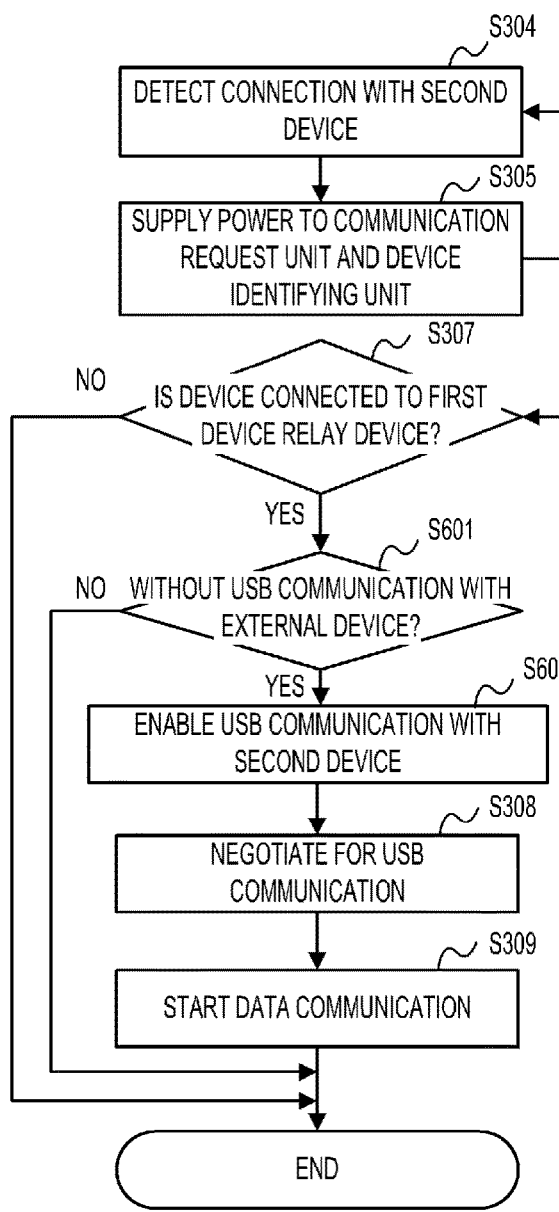
FIG. 6 is a flowchart for illustrating a USB communication process according to the second embodiment.
Figure 6:
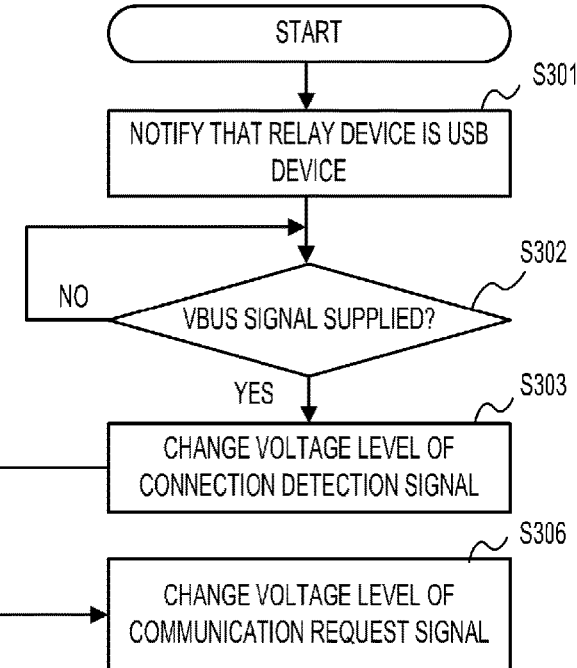

Next, with reference to the flowchart in FIG. 6, the operation of the relay device 110 and the first device 100 according to the second embodiment will be described. Here, in the following description, the "first insertion priority method" is used as a method for the CPU 101 to determine whether to perform USB communication with the second device 120 or the external device 200.

First, the CPU 101 starts up when the user operates a group of switches of the first device 100 and the first device 100 is turned on as a result. Next, the user connects the ACC connector 116 of the relay device 110 and the ACC connector 103 of the first device 100. The user also connects the USB connector 122 of the second device 120 and the USB connector 115 of the relay device 110. When these connections are made by the user, the process as shown in the flowchart in FIG. 6 starts. Since steps S301 to S309 are the same as the steps according to the first embodiment described with reference to the flowchart in FIG. 3, their description will not be provided.

In step S601, the CPU 101 determines whether the first device 100 and the external device 200 are in USB communication. When the first device 100 and the external device 200 are not in USB communication, the process proceeds to step S602. When the first device 100 and the external device 200 are in USB communication, this USB communication is continued and the process as shown in the flowchart ends.

In step S602, the CPU 101 outputs, to the switching circuit 402, the USB switching signal 506 indicating that the device for USB communication is the second device 120. Then, the switching circuit 402 carries out such control that the USB data signal 125 is input to or output from the USB port of the CPU 101.

As described above, according to the second embodiment, even when the CPU has only one USB port system and the camera has a USB connector separate from an accessory-dedicated connector, USB communication is allowed exclusively with either of the connectors by switching between the USB data signals.

Third Embodiment

The various functions, processes, or methods described in connection with the above embodiments can also be implemented as a personal computer, a microcomputer, a CPU (Central Processing Unit) or a microprocessor executes a program. Hereafter, according to a third embodiment, a personal computer, a microcomputer, a CPU or a microprocessor will be referred to as "computer X." According to the third embodiment, a program for controlling the computer X and implementing the various functions, processes, or methods described in conjunction with the above embodiments will be referred to as "program Y."

The various functions, processes, or methods described in conjunction with the above embodiments are implemented as the computer X executes the program Y. In this case, the program Y is supplied to the computer X through a computer-readable storage medium. The computer-readable storage medium according to the third embodiment may include at least one of a hard disk device, a magnetic storage device, an optical storage device, a magneto-optical storage device, a memory card, a volatile memory, and a non-volatile memory. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-202273, filed Dec. 4, 2020, which is hereby incorporated by reference herein in its entirety.

What is claimed is:

1. A relay device comprising:
a first connecting unit to be connected with a first interface of a first device, the first interface being not compliant with USB (Universal Serial Bus) standard;
a second connecting unit to be connected with a second interface of a second device, the second interface being compliant with the USB standard;
a first notifying unit that notifies the second device that the relay device is a USB device;
a second notifying unit that notifies the first device that the second device has been connected to the second connecting unit; and
a communicating unit that relays USB communication carried out between the second device functioning as a USB host and the first device functioning as a USB device.

2. The relay device according to claim 1, wherein notifying the first device that the second device has been connected to the second connecting unit is performed in a case where a VBUS signal is supplied from the second device.

3. The relay device according to claim 1, further comprising a storage unit that stores identification information of the relay device indicating that the relay device can relay communication compliant with the USB standard.

4. The relay device according to claim 3, wherein the storage unit operates with power supplied from the first device through the first connecting unit.

5. The relay device according to claim 1, wherein the first connecting unit connects with an accessory shoe of the first device.

6. The relay device according to claim 1, wherein the first device is capable of acting as a digital camera.

7. The relay device according to claim 1, wherein the second device is capable of acting as a smartphone.

8. A method of controlling a relay device comprising a first connecting unit to be connected with a first interface of a first device and a second connecting unit to be connected with a second interface of a second device, the first interface being not compliant with USB (Universal Serial Bus) standard and the second interface being compliant with the USB standard, the method comprising:
notifying the second device that the relay device is a USB device;
notifying the first device that the second device has been connected to the second connecting unit; and
relaying USB communication carried out between the second device functioning as a USB host and the first device functioning as a USB device.

9. The method according to claim 8, wherein notifying the first device that the second device has been connected to the second connecting unit is performed in a case where a VBUS signal is supplied from the second device.

10. The method according to claim 8, wherein the relay device further comprises a storage unit that stores identification information of the relay device indicating that the relay device can relay communication compliant with the USB standard.

11. The method according to claim 10, wherein the storage unit operates with power supplied from the first device through the first connecting unit.

12. The method according to claim 8, wherein the first connecting unit connects with an accessory shoe of the first device.

13. The method according to claim 8, wherein the first device is capable of acting as a digital camera.

14. The method according to claim 8, wherein the second device is capable of acting as a smartphone.

15. A non-transitory storage medium that stores a program causing a computer to execute a method of controlling a relay device comprising a first connecting unit to be connected with a first interface of a first device and a second connecting unit to be connected with a second interface of a second device, the first interface being not compliant with USB (Universal Serial Bus) standard and the second interface being compliant with the USB standard, the method comprising:
notifying the second device that the relay device is a USB device;
notifying the first device that the second device has been connected to the second connecting unit; and
relaying USB communication carried out between the second device functioning as a USB host and the first device functioning as a USB device.

* * * * *